J. WORLEY.
Straw Cutter.
No. 1,643.
Patented June 20, 1840.
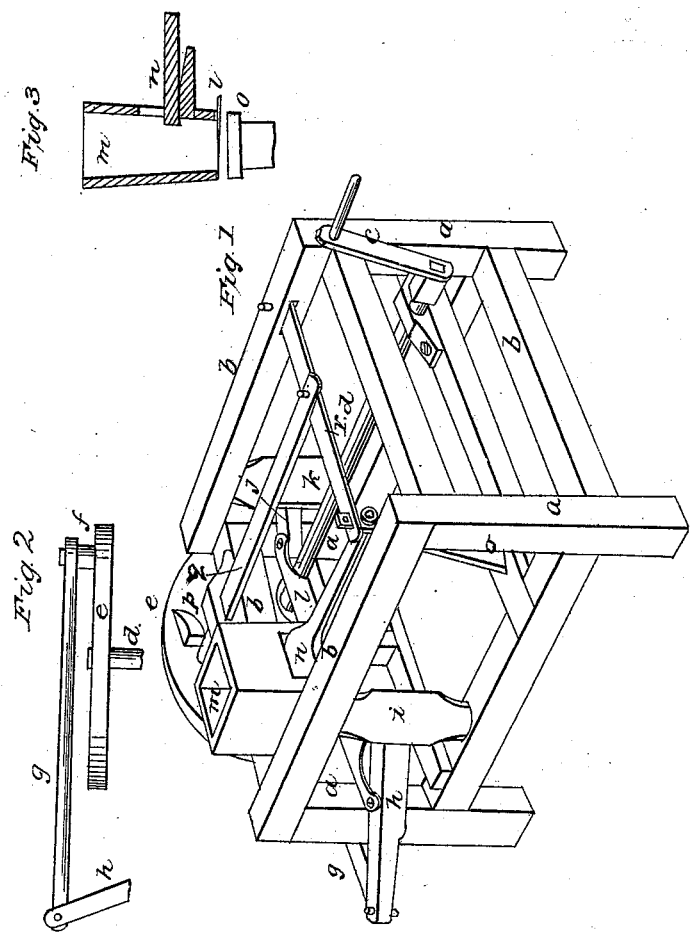

UNITED STATES PATENT OFFICE.

JOSEPH WORLEY, OF HAWKINS COUNTY, TENNESSEE.

STRAW-CUTTER.

Specification of Letters Patent No. 1,643, dated June 20, 1840.

*To all whom it may concern:*

Be it known that I, JOSEPH WORLEY, of the county of Hawkins, in the State of Tennessee, have invented a new and useful Improvement in Machines for Cutting Straw, Hay, Husks, or other Provender Used in Feeding Stock, called "Worley's Straw-Cutter"; and I do hereby declare that the following is a full and exact description of my said improvement and machine.

First, a frame $a$, Figure 1, of four upright parts at the corners, about three or three and a half feet square, though the size of the frame may be varied at pleasure, horizontal bars $b$, framed into the posts to act as stays for the frame and machinery hereinafter described. The number of bars may be varied.

Second, crank motion, by means of a lever or winch $c$, driving a shaft $d$, placed horizontally across the machine, with a fly wheel $e$, at the extremity from the winch and beyond the frame (this shaft and fly can be placed either way across the frame and act on the lever in the same manner.) On the end of the shaft holding the fly a crank pin $f$, Fig. 2 is set, the length of which crank will depend upon and govern the depth of the cut wanted. This crank gives motion to the cutting knife by means of a rod $g$, attached at the one end to the neck of the crank, the other extremity to an arm $h$, issuing out of an upright $i$, made to move on pivots set into the horizontal bars or stays; on the opposite side of the frame $a$ another arm $j$, set in another upright $k$, with pivots. These arms support the knife $l$, at each end by means of pins, suffering it to move as a hinge upon the arm as a rest about the same distance from the upright so that the crank motion by means of the rod $g$, will give to the knife an alternate backward and forward motion, which being at each end of the knife in the segment of a circle or arch will give to the knife two motions, the one sliding, the other forward (or backward), cutting and returning. Wedges may be used above and below the tenons of the bars sustaining the pivots and uprights so as to raise or depress the knife.

Third, the straw or substance to be cut is placed endwise in an upright box or hopper $m$, set over the play of the knife, the box placed at the upper end, the substance to be cut sinks by its own gravity or can be forced by the hand, a stop board $o$ Fig. 3 placed horizontally below the knife regulates the length of the cut, the edge of the box next the knife is armed with a strip of steel for the knife to operate against—these may be inside or outside of the box.

Fourth, a press piece $n$, (or compress) to hold the substance while cutting. This compress enters the lower end of the box holding the straw above the cutting knife. It operates horizontally. The motion to the cut is produced by a spring $o$, forming the compress $n$, to the straw, &c. It is thrown back by a cam $p$, set to the side of the fly wheel $e$. This cam strikes a rod $q$, which presses back the compress, letting the straw fall. The cam is so adjusted on the wheel or on one of its arms that the power of the compress is taken off when the cut is through. This part of the machine requires the cam, the rod, a lever for the end of the rod to operate upon taking off the force of the spring, as represented in the drawing.

Fifth, to increase speed the shaft and fly wheel may be driven by cog wheels, and the driving and driven wheels must be proportioned to produce the effect wanted.

All the advantages of the above described machine can be had by a mere modification of what I claim as my improvements by erecting the machinery to take in the substance horizontally—the knife to move vertically, but by means of like arms, pivots, &c., producing a sliding and forward motion—or can be worked by hand with like motions.

For what I claim as my invention is—

1. My plan of giving to the knife an oblique or draw cut by means of the vibrating beams to which the knife is attached and operated, as above described.

2. Also the means by which the press piece $n$, is made to operate consisting of the combination of the spring $o$, the lever $r$ and the connecting rod $q$ acted upon by the cam $p$, on the fly wheel as above described.

3. Also the particular manner in which I have combined said press piece hopper and knife as herein set forth.

In testimony that the above are my specifications I hereunto set my hand the 22d day of February, 1840.

JOSEPH WORLEY.

Witnesses:
 JACOB PECK,
 GEORGE W. DUNKIN.